United States Patent
Jain

(10) Patent No.: US 9,104,664 B1
(45) Date of Patent: *Aug. 11, 2015

(54) ACCESS TO SEARCH RESULTS

(75) Inventor: Arvind Jain, Los Altos, CA (US)

(73) Assignee: Google Inc., Mountain View, CA (US)

( * ) Notice: Subject to any disclaimer, the term of this patent is extended or adjusted under 35 U.S.C. 154(b) by 777 days.

This patent is subject to a terminal disclaimer.

(21) Appl. No.: 13/268,279

(22) Filed: Oct. 7, 2011

(51) Int. Cl.
*G06F 17/30* (2006.01)
*G06F 17/00* (2006.01)

(52) U.S. Cl.
CPC ..................................... *G06F 17/30* (2013.01)

(58) Field of Classification Search
CPC .......... G06F 17/30902; G06F 17/2247; G06F 17/30864; G06F 17/30905; G06F 17/30873; G06F 17/30899; G06F 17/30; G06F 17/30867; G06F 17/212; G06F 3/0237; G06F 3/04883; G06F 3/048; G06F 11/3419; G06F 17/21; G06F 17/211; G06F 17/276; G06F 17/30241
USPC ................................................. 707/706, 721
See application file for complete search history.

(56) References Cited

U.S. PATENT DOCUMENTS

| | | |
|---|---|---|
| 5,715,445 A | 2/1998 | Wolfe |
| 5,727,129 A | 3/1998 | Barrett et al. |
| 5,946,682 A | 8/1999 | Wolfe |
| 6,055,569 A | 4/2000 | O'Brien et al. |
| 6,100,871 A | 8/2000 | Min |
| 6,151,603 A | 11/2000 | Wolfe |
| 6,182,133 B1 | 1/2001 | Horvitz |
| 6,256,712 B1 | 7/2001 | Challenger et al. |
| 6,301,576 B1 | 10/2001 | Wolfe |
| 6,467,029 B1 | 10/2002 | Kitayama |
| 6,604,103 B1 | 8/2003 | Wolfe |
| 6,976,090 B2 | 12/2005 | Ben-Shaul et al. |
| 7,047,502 B2 | 5/2006 | Petropoulos et al. |
| 7,103,594 B1 | 9/2006 | Wolfe |
| 7,277,924 B1 | 10/2007 | Wichmann et al. |
| 7,428,701 B1 | 9/2008 | Gavin et al. |
| 7,467,137 B1 | 12/2008 | Wolfe |

(Continued)

FOREIGN PATENT DOCUMENTS

| | | |
|---|---|---|
| JP | 2004536389 A | 12/2004 |
| KR | 20070101237 A | 10/2007 |

(Continued)

OTHER PUBLICATIONS

International Search Report and Written Opinion for Application No. PCT/US2012/055473 dated Feb. 26, 2013.

(Continued)

*Primary Examiner* — Yicun Wu

(74) *Attorney, Agent, or Firm* — Lerner, David, Littenberg, Krumholz & Mentlik, LLP

(57) ABSTRACT

A method and system for improving access to search results are described. Aspects of the disclosure minimize the delay between a search query and display of results responsive to the query by prerendering the search engine result page and passing a query to the search engine result page as soon as the query is entered. The search query may be provided to the search engine result page using a search application programming interface provided by scripts executing on the prerendered web page. Non-search-result content may be requested, downloaded, and rendered in the background prior to receiving the search query in order to minimize delay in the displaying of search results.

21 Claims, 6 Drawing Sheets

(56) References Cited

U.S. PATENT DOCUMENTS

| | | | |
|---|---|---|---|
| 7,480,669 B2 | 1/2009 | Lo et al. |
| 7,487,147 B2 | 2/2009 | Bates et al. |
| 7,536,635 B2 | 5/2009 | Racovolis et al. |
| 7,562,115 B2 | 7/2009 | Zircher et al. |
| 7,613,712 B2 | 11/2009 | Greenblatt et al. |
| 7,631,032 B1 | 12/2009 | Refuah et al. |
| 7,660,815 B1 | 2/2010 | Scofield et al. |
| 7,685,192 B1 | 3/2010 | Scofield et al. |
| 7,716,332 B1 | 5/2010 | Topfl et al. |
| 7,747,749 B1 | 6/2010 | Erikson et al. |
| 7,802,305 B1 | 9/2010 | Leeds |
| 7,805,673 B2 | 9/2010 | der Quaeler et al. |
| 7,840,589 B1 | 11/2010 | Holt et al. |
| 7,876,335 B1 | 1/2011 | Pittenger et al. |
| 7,908,336 B2 | 3/2011 | Carlson et al. |
| 8,112,308 B1 | 2/2012 | Ho et al. |
| 8,260,938 B2 | 9/2012 | Gupta et al. |
| 8,356,247 B2* | 1/2013 | Krassner et al. | 715/234 |
| 8,386,509 B1 | 2/2013 | Scofield et al. |
| 8,391,461 B2* | 3/2013 | Skakkebaek et al. | 379/215.01 |
| 8,402,481 B1* | 3/2013 | Urbach | 719/329 |
| 8,504,907 B2 | 8/2013 | Piersol |
| 8,549,497 B2 | 10/2013 | Ghorbani et al. |
| 8,600,968 B2* | 12/2013 | Holenstein et al. | 707/706 |
| 8,745,212 B2 | 6/2014 | Jain et al. |
| 8,892,638 B2 | 11/2014 | Chang et al. |
| 2002/0075333 A1 | 6/2002 | Dutta et al. |
| 2003/0005038 A1 | 1/2003 | Codella et al. |
| 2003/0050906 A1 | 3/2003 | Clifton-Bligh |
| 2003/0061451 A1 | 3/2003 | Beyda |
| 2003/0088573 A1 | 5/2003 | Stickler |
| 2003/0088580 A1 | 5/2003 | Desai et al. |
| 2003/0182390 A1 | 9/2003 | Alam |
| 2003/0193994 A1 | 10/2003 | Stickler |
| 2003/0212760 A1 | 11/2003 | Chen et al. |
| 2004/0031052 A1 | 2/2004 | Wannamaker et al. |
| 2004/0267600 A1 | 12/2004 | Horvitz |
| 2004/0268228 A1 | 12/2004 | Croney et al. |
| 2005/0055426 A1 | 3/2005 | Smith et al. |
| 2005/0132296 A1 | 6/2005 | Milic-Frayling et al. |
| 2005/0240576 A1 | 10/2005 | Piscitello et al. |
| 2005/0251396 A1 | 11/2005 | Tyler |
| 2006/0047804 A1 | 3/2006 | Fredricksen et al. |
| 2006/0064411 A1 | 3/2006 | Gross et al. |
| 2006/0143568 A1 | 6/2006 | Milener et al. |
| 2006/0282771 A1 | 12/2006 | Vinci |
| 2007/0005425 A1 | 1/2007 | Bennett et al. |
| 2007/0198634 A1 | 8/2007 | Knowles et al. |
| 2007/0204057 A1 | 8/2007 | Shaver et al. |
| 2007/0208704 A1 | 9/2007 | Ives |
| 2007/0220010 A1 | 9/2007 | Ertugrul |
| 2007/0226633 A1 | 9/2007 | Lyle et al. |
| 2007/0260585 A1 | 11/2007 | Bodine et al. |
| 2007/0288648 A1 | 12/2007 | Mehanna et al. |
| 2008/0052219 A1 | 2/2008 | Sandholm et al. |
| 2008/0104407 A1 | 5/2008 | Horne et al. |
| 2008/0140941 A1 | 6/2008 | Dasgupta et al. |
| 2008/0201332 A1 | 8/2008 | Souders et al. |
| 2008/0208789 A1 | 8/2008 | Almog |
| 2008/0249969 A1 | 10/2008 | Tsui et al. |
| 2008/0256134 A1 | 10/2008 | Bogner et al. |
| 2008/0295006 A1 | 11/2008 | LuVogt et al. |
| 2008/0320222 A1 | 12/2008 | Dhodapkar |
| 2009/0013006 A1 | 1/2009 | Friedl et al. |
| 2009/0070392 A1 | 3/2009 | Le Roy et al. |
| 2009/0094196 A1 | 4/2009 | Piwowarski et al. |
| 2009/0106349 A1 | 4/2009 | Harris |
| 2009/0132949 A1 | 5/2009 | Bosarge |
| 2009/0158221 A1 | 6/2009 | Nielsen et al. |
| 2009/0171930 A1 | 7/2009 | Vaughan et al. |
| 2009/0210806 A1 | 8/2009 | Dodson et al. |
| 2009/0216639 A1 | 8/2009 | Kapczynski et al. |
| 2009/0254515 A1 | 10/2009 | Terheggen et al. |
| 2009/0254643 A1 | 10/2009 | Terheggen et al. |
| 2009/0265774 A1 | 10/2009 | Malik et al. |
| 2009/0327424 A1 | 12/2009 | Bernstein et al. |
| 2010/0005061 A1 | 1/2010 | Basco et al. |
| 2010/0023581 A1 | 1/2010 | Lahav |
| 2010/0031366 A1 | 2/2010 | Knight et al. |
| 2010/0107115 A1 | 4/2010 | Sareen et al. |
| 2010/0131902 A1 | 5/2010 | Teran et al. |
| 2010/0191856 A1 | 7/2010 | Gupta et al. |
| 2010/0251116 A1 | 9/2010 | Rimas-Ribikauskas et al. |
| 2010/0306665 A1 | 12/2010 | Milic-Frayling et al. |
| 2010/0312858 A1* | 12/2010 | Mickens et al. | 709/219 |
| 2011/0029518 A1 | 2/2011 | Tong |
| 2011/0029670 A1 | 2/2011 | Klein et al. |
| 2011/0066732 A1 | 3/2011 | Iwade et al. |
| 2011/0119361 A1 | 5/2011 | Issa et al. |
| 2011/0173569 A1 | 7/2011 | Howes et al. |
| 2011/0199304 A1 | 8/2011 | Walley et al. |
| 2011/0225494 A1 | 9/2011 | Shmuylovich et al. |
| 2011/0289317 A1 | 11/2011 | Darapu et al. |
| 2012/0017146 A1 | 1/2012 | Travieso et al. |
| 2012/0084644 A1 | 4/2012 | Robert et al. |
| 2012/0110435 A1 | 5/2012 | Green |
| 2012/0137201 A1 | 5/2012 | White et al. |
| 2012/0158740 A1 | 6/2012 | Smola et al. |
| 2012/0254721 A1 | 10/2012 | Jain et al. |
| 2012/0254727 A1 | 10/2012 | Jain et al. |
| 2012/0324043 A1 | 12/2012 | Burkard et al. |
| 2013/0007260 A1 | 1/2013 | Jain et al. |
| 2013/0185633 A1 | 7/2013 | Bunker et al. |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

StackOverflow.com, "Detect if Browser Tab Has Focus," Sep. 2011, 2 pages.
International Search Report & Written Opinion dated May 7, 2013 for Application No. PCT/US2013/021927.
https://developer.mozilla.org/en/Link_prefetching_FAQ (2003).
International Search Report and Written Opinion for Application No. PCT/US2013/062245 dated Jan. 28, 2014.
International Search Report and Written Opinion for Application No. PCT/US2012/042186 dated Feb. 20, 2013.
Fisher, Darin,"Link Prefetching FAQ," dated Mar. 3, 2003, published by Mozilla Developer Network (MDN), from https://developer.mozilla.org/en/Link_prefetching_FAQ (2003).
Christopher Schmitt, "CSS Cookbook, Third Edition," O'Reilly Media, Dec. 24, 2009, pp. 1, 33, 35 and 217-219.
Venoila et al. "T-Cube: A Fast, Self-Disclosing Pen-Based Alphabet". Copyright Date 1994.
Guimbretiere et al. "FlowMenu: Combining Command, Text, and Data Entry". Copyright 2000.
U.S. Appl. No. 13/353,626, filed Jan. 19, 2012.
International Search Report dated Nov. 28, 2012, in International Application No. PCT/US2012/036519.
International Search Report and Written Opinion dated Dec. 14, 2012 for PCT application US2012044896.
U.S. Appl. No. 13/175,067, filed Jul. 1, 2011.
U.S. Appl. No. 13/100,615, filed May 4, 2011.
U.S. Appl. No. 13/175,115, filed Jul. 1, 2011.
U.S. Appl. No. 13/174,925, filed Jul. 1, 2011.
U.S. Appl. No. 13/174,928, filed Jul. 1, 2011.
U.S. Appl. No. 13/182,920, filed Jul. 14, 2011.
U.S. Appl. No. 13/183,824, filed Jul. 15, 2011.
U.S. Appl. No. 13/233,314, filed Sep. 15, 2011.
U.S. Appl. No. 13/233,300, filed Sep. 15, 2011.
Extended European Search Report for Application No. 12831760.9 dated Feb. 17, 2015.

\* cited by examiner

ACCESS TO SEARCH RESULTS

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for improving access to search results are provided in the disclosure herein. Aspects of this disclosure minimize the delay in accessing search results by prerendering elements of a search page. Aspects of the disclosure may provide a search query to the preloaded search page via a search application programming interface. The preloaded search web page may be made visible in response to the search query such that the user does not need to wait for rendering of the web page (e.g., fetching and rendering of page formatting, logos, scripts, and the like), thus allowing for immediate display of search results as soon as the results are received.

Aspects of the disclosure describe a computer-implemented method for improving access to search results. The method may include prerendering, using a processor, a search engine page in a hidden browser instance, such that at least some portion of content of the search engine page other than search results responsive to a search query is rendered, receiving the search query via a text entry field, passing the search query to the search engine page to perform a search using the search query, and merging the search engine page into an active browser instance to facilitate display of one or more search results responsive to the search query as the one or more search results are received via the search engine. The text entry field may allow for navigation within a web browser by entry of a website address. The text entry field may determine whether the text entry is a search query or a website address. The search query may be passed to the search engine page using a search application programming interface (API). The search engine page may be configured to receive a search query via a scripted interface provided by the search API. The method may further include configuring a web browser to use a particular search engine for the search engine page. The method may also include prerendering the search engine page in response to at least one of the browser executing, detecting interface focus on the text entry field, detecting text entry in the text entry field, determining that the text entry in the text entry field is not an address, and detecting an enter character in the text entry field. The search query may be passed to the search engine in response to at least one of detecting interface focus on the text entry field, detecting text entry in the text entry field, determining that the text entry in the text entry field is not an address, and detecting an enter character in the text entry field.

Aspects of the disclosure may also provide a processing system for improving access to search results. The processing system may include at least one processor and a memory coupled to the processor. The processor may be configured to execute a browser application, prerender a search engine page in a hidden instance of the browser application, such that at least some portion of content of the search engine page other than search results responsive to a search query is rendered, receive the search query via a text entry field, pass the search query to the search engine page to perform a search using the search query, and merge the search engine page into an active browser instance to facilitate display of one or more search results responsive to the search query as the one or more search results are received via the search engine. The text entry field may allow for navigation within a web browser by entry of a website address. The text entry field may determine whether the text entry is a search query or a website address. The search query may be passed to the search engine page using a search application programming interface (API). The search engine page may be configured to receive a search query via a scripted interface provided by the search API. The processor may be further configured to configure a web browser to use a particular search engine for the search engine page. The processor may also be configured to prerender the search engine page in response to at least one of the browser executing, detecting interface focus on the text entry field, detecting text entry in the text entry field, determining that the text entry in the text entry field is not an address, and detecting an enter character in the text entry field. The search query may be passed to the search engine in response to at least one of detecting interface focus on the text entry field, detecting text entry in the text entry field, determining that the text entry in the text entry field is not an address, and detecting an enter character in the text entry field.

Aspects of the disclosure may also provide a non-transitory computer readable storage medium containing instructions that, when executed by a processor cause the processor to perform a method. The method may include prerendering a search engine page in a hidden browser instance, such that at least some portion of content of the search engine page other than search results responsive to a search query is rendered, receiving the search query via a text entry field, passing the search query to the search engine page to perform a search using the search query, and merging the search engine page into an active browser instance to facilitate display of one or more search results responsive to the search query as the one or more search results are received via the search engine. The text entry field may allow for navigation within a web browser by entry of a website address. The text entry field may determine whether the text entry is a search query or a website address. The search query may be passed to the search engine page using a search application programming interface (API).

DETAILED DESCRIPTION

A method and system for improving access to search results are provided in the disclosure herein. Aspects of this disclosure minimize the delay in accessing search results by prerendering elements of a search page. Aspects of the disclosure may provide a search query to the preloaded search page via a search application programming interface. The preloaded search web page may be made visible in response to the search query such that the user does not need to wait for rendering of the web page (e.g., fetching and rendering of page formatting, logos, scripts, and the like), thus allowing for immediate display of search results as soon as the results are received. Various methods for performing the prerendering operation, configuring the prerendering operation, and managing the prerendering operation are described. For the purposes of this application, the term "prerendering" generally refers to the act of requesting all resources (e.g., any executable code, scripting language, files, and/or interactive objects) necessary to load the content of a web address, and loading the content in a web browser instance.

Figure 1:
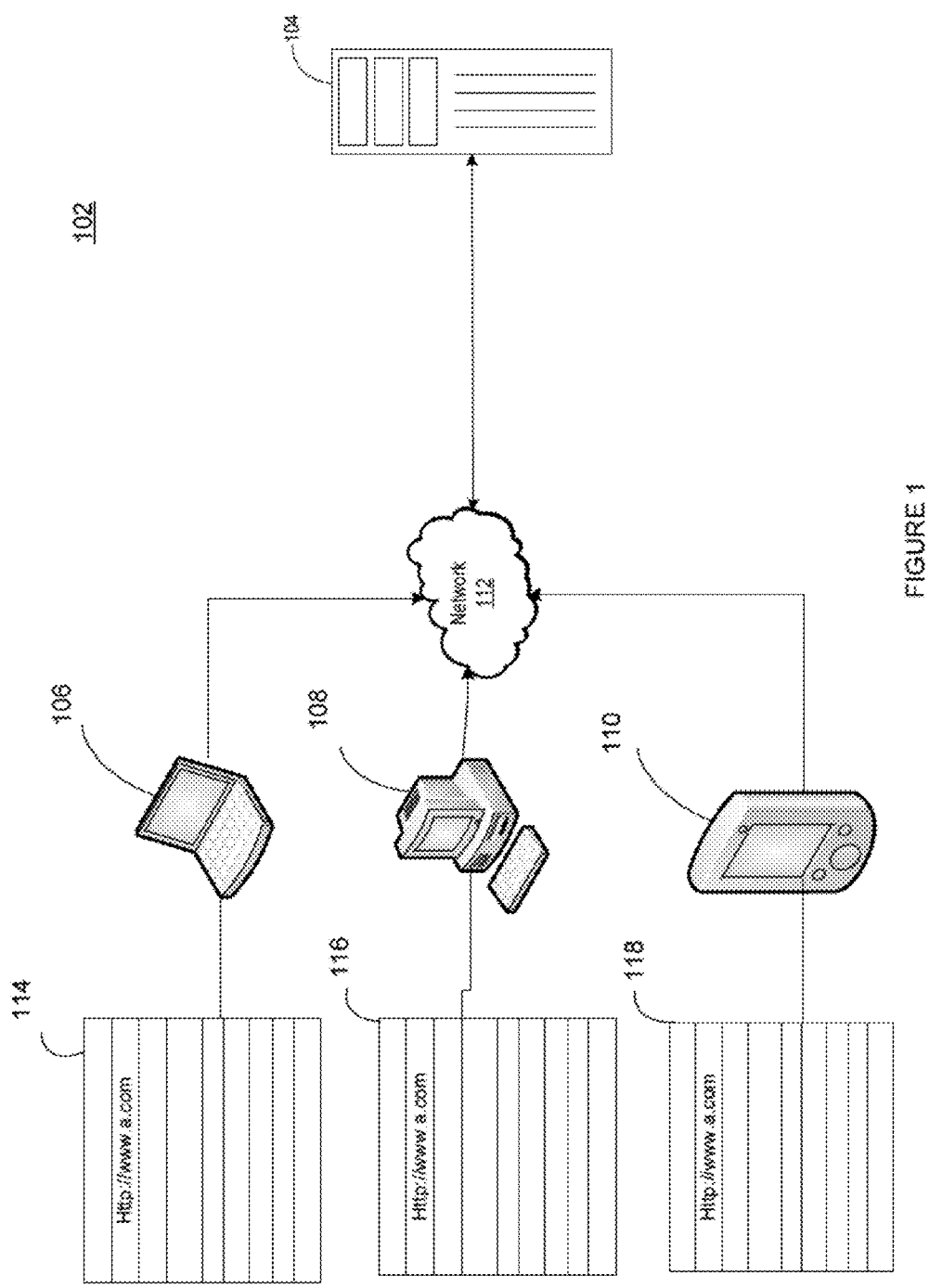
FIG. 1 is a system diagram depicting an example of a server in communication with example client devices in accordance with aspects of the disclosure.

As shown in FIG. 1, an example system 102 in accordance with one aspect includes a server 104 in communication with one or more client devices 106, 108, 110 displaying web browser interfaces 114, 116, 118. The user of the client device 106 may browse to a web page located at "www.a.com" as displayed on the web browser interface 114. That page includes content selectable by the user.

The client devices may be any device capable of managing data requests via a network 112. Examples of such client devices include a personal computer (PC) 108, a mobile device 110, or a server 106. The client devices 106, 108, 110 are operable to perform prerendering operations during the execution of a web browser application. In some aspects, the client devices 106, 108, 110 predict a search event by identifying cursor placement, text entry, or interface focus. The prerender operation may also be determined dynamically by, for example, a JAVASCRIPT code. While the concepts described herein are generally described with respect to a web browser interface 114, 116, 118 executing on a client device 106, 108, 110, aspects of the disclosure can also be applied to any computing node capable of managing navigation events over a network, including a server 104.

The client devices 106, 108, 110 may also comprise personal computers, personal digital assistants ("PDA"): tablet PCs, netbooks, laptops, mobile phones, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 may be operable to predict search operations to assist in data access on the network 112. For example, the client devices may predict a search operation to facilitate prerendering of a search page in order to decrease delay in the display of search results, thus improving the user's browsing experience. In some aspects, the server 104 provides navigation data which may be used by the client devices 106, 108, 110 to predict a search operation. In some aspects, the client devices 106, 108, 110 predict a search operation using local data.

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
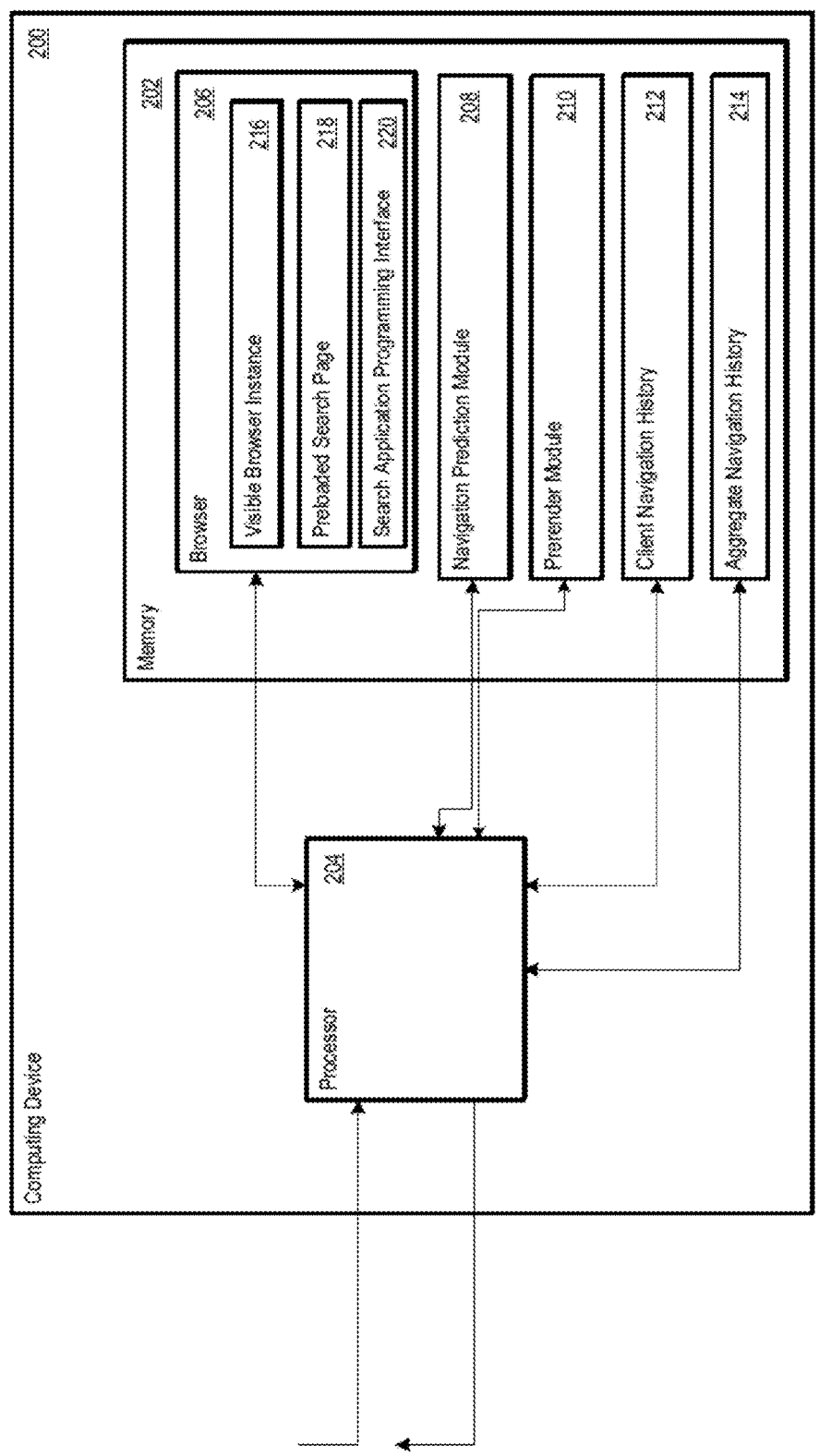
FIG. 2 is block diagram depicting an example of a computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions and data that are accessible by the processor 204. The processor 204 may execute the instructions and access the data to control the operations of the computing device 200.

The memory 202 may be any type of tangible memory operative to store information accessible by the processor 204, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions may be stored in object code format for direct processing by the processor 204, or in any other computer language including scripts or collections of independent source code modules that are interpreted on demand or compiled in advance. Functions, methods and routines of the instructions are explained in more detail below (see FIGS. 3-6).

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor 204 may be a dedicated controller such as an application-specific integrated circuit ("ASIC").

Although FIG. 2 functionally illustrates the processor and memory as being within a single block, it should be understood that the processor 204 and memory 202 may actually comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicates with other nodes of the network. For example, the computing device 200 may comprise a web server that is operative to communicate with client devices via the network such that the computing device 200 uses the network to transmit and display information to a user on a display of the client device.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

In order to facilitate the prerendering and search operations of the computing device 200, the memory 202 may further comprise a browser 206, a navigation prediction module 208, a prerender module 210, a client navigation history 212, and an aggregate navigation history 214. Although a number of discrete modules (e.g., 206, 208, 210, 212 and 214) are identified in connection with FIG. 2, the functionality of these modules may overlap and/or exist in a fewer or greater number of modules than what is shown, with such modules residing at one or more processing devices, which may be geographically dispersed.

The browser 206 provides for the display of a web page to a user of the client device via a visible browser instance 216 by sending and receiving data across a computer network. The web page may be received in response to a network request, such as a Hypertext Transfer Protocol (HTTP) GET request. The web page may be provided in a markup language, such as Hypertext Markup Language (HTML). The web page may also include various scripts, data, forms, and the like viewable and/or executed in the visible browser instance 216, including interactive and/or executable content such as ADOBE FLASH content, JAVASCRIPT content, and the like.

The browser 206 may further comprise a preloaded search page 218. The preloaded search page 218 represents a search engine for which non-search-result data (e.g., page formatting, logos, images, style sheets, scripts, and the like) has been requested and rendered by the prerender module 210. The preloaded search page 218 may be stored in a hidden rendering environment such that the preloaded search page 218 is not visible to a user until the user provides a search query. The hidden rendering environment refers to any representation that does not have an immediately apparent interface for the user. For example, the preloaded search page 218 may be stored within a browser "tab" that does not have an associated selection control in a web browser tab interface. The hidden rendering environment may be accessible via a menu or interface command, and in response to the selection of this interface command an interface for the prerendered content is generated, such as by adding a selection control for the prerendered content to the browser tab interface. The hidden rendering environment may also be provided by a variety of other methods suitable to receive and render the page environment while avoiding distraction of the user with potentially irrelevant content. The preloaded search page 218 may be stored in a completely executed and rendered format. For example, any executable code, scripting language, multimedia files, and/or interactive objects may be fully requested and loaded in the prerendering environment provided by the hidden browser instance. In the event the user enters a search query, the browser 206 may execute the search query using the preloaded search page 218, and merge the preloaded search page 218 with the visible browser instance 216, thus providing search results responsive to the search query without the need to request the search engine page or wait for the search engine page to render. Throughout this process the preloaded search page 218 may issue the query over the network to the search engine, receive data providing results for the search query, blend the results into the preloaded search page 218, and make itself visible The web browser 206 may further comprise a search application programming interface (API) 220. The search API 220 allows for a scripted interface with a search engine, such as the preloaded search page 218. When the browser 206 detects a search query (e.g., entered into a text field provided by the browser), the browser 206 may pass the search query to the preloaded search page 218 using the search API 220. For example, the search query may be passed to the preloaded search page 218 using an asynchronous JavaScript and extensible markup language (AJAX) protocol. The preloaded search page 218 may be specifically configured to communicate in this manner, allowing the client computing device 200 to provide a search query without the need to navigate to a new URL to perform the query. The search API 220 may be configurable within the browser 206. For example, a user may specify a particular search engine for use in search operations performed by the browser.

The memory 202 may further comprise a prerender module 210 to perform fetching of the preloaded search page 218 when identified by the navigation prediction module 208. In some aspects, the navigation prediction module 208 may identify when the user intends to perform a search operation for the purpose of prerendering the preloaded search page 218. For example, a search operation may be predicted when a text field receives focus. The prerender module 210 sends a network request for a web page, such as a search home page, if it is determined the user wishes to perform a search. The web page received in response to this request is stored in the browser 206 as the preloaded search page 218. In some aspects, the web page request generated by the prerender module 210 is identical to a standard web page request. In some aspects, the web page request generated by the prerender module 210 comprises certain features to facilitate the prerender process as described further below (see FIGS. 3-6).

In some aspects, the computing device 200 may determine a likely navigation event or search operation using a client navigation history, such as the client navigation history 212. The client navigation history 212 comprises a set of navigation events associated with past activity of the browser 206. The client navigation history 212 may track a set of visited URLs, also known as a "clickstream," which tracks an order in which the user typically visits URLs (e.g., when the user visits a news website, they tend to next select a URL corresponding to the top story of the day), a set of access times associated with the URLs, and the like. The aggregate navigation history 214 may comprise similar data, but keyed to multiple users rather than a single user. The client navigation history 212 and aggregate navigation history 214 may represent data collected using one or more browser add-ons, scripts, or toolbars. In some aspects, the client navigation history 212 and/or aggregate navigation history 214 are maintained on a remote server, such as the server 104, and provided to the computing device 200. The computing device 200 may maintain separate records to facilitate the prediction of a next likely navigation event or search operation, or it may act in concert with remotely stored data. In some aspects, only aggregate navigation history 214 pertaining to the particular web page the user is currently viewing is provided to the computing device 200.

As described above, the aggregate navigation history data 214 can be maintained in an anonymous fashion, with privacy protections for the individual client data that comprises the aggregate navigation history, including, for example, anonymization of personally identifiable information, aggregation of data, filtering of sensitive information, encryption, hashing or filtering of sensitive information to remove personal attributes, time limitations on storage of information, and/or limitations on data use or sharing. The aggregate navigation history 214 data can be anonymized and aggregated such that individual client data is not revealed.

Figure 3:
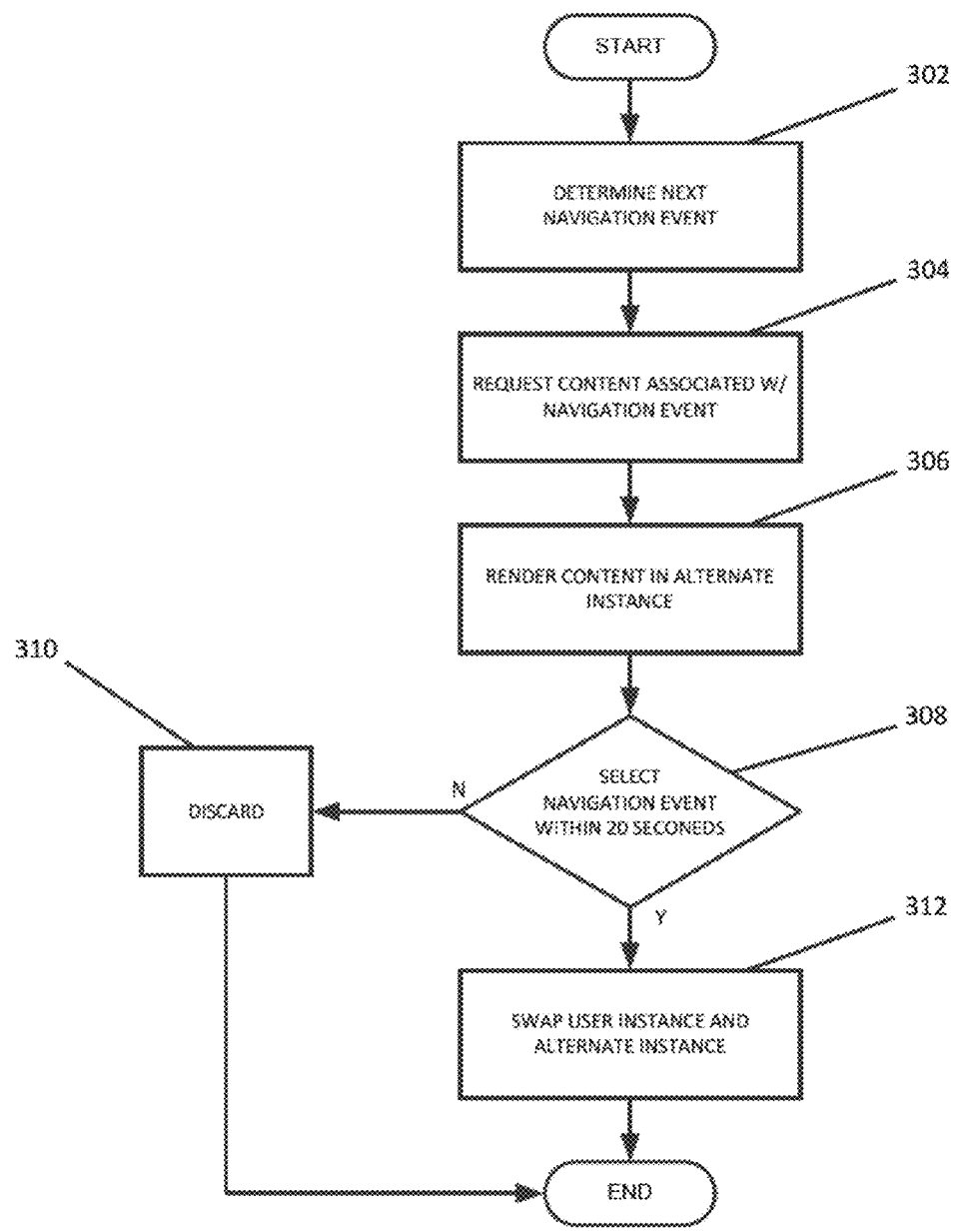
FIG. 3 is a flow diagram depicting an example method for prerendering a web page in accordance with aspects of the disclosure.

FIG. 3 is a flow diagram depicting an example method 300 for prerendering a web page, such as the preloaded search page 218, in accordance with aspects of the disclosure. Aspects of the method 300 operate to minimize load times for network content by requesting the network content prior to the user navigating to said network content. The method 300 may be performed by a computing device, such as the computing device 200, to eliminate delays in the user search experience by prerendering a search page in a hidden browser instance prior to the user entering a search query. For example, the method 300 may be performed by elements of the browser 206, the navigation prediction module 208, and the prerender module 210 acting together. While aspects of the method 300 are described with respect to the computing device 200, the method 300 may also be performed by the server 104, or any device with hardware and/or software designed to accept instructions.

At stage 302, the computing device 200 determines a next navigation event, such as a search operation, within a web browser. The next navigation event may be received from a navigation prediction element, such as the navigation prediction module 208, or the next navigation event may be embedded within the web page displaying within the web browser. For example, a search engine may embed a tag within a set of search results to indicate that a particular link associated with the most relevant result should be prerendered by the web browser. A method for embedding prerendering tags within a web page is described below (see FIG. 4).

At stage 304, the computing device 200 requests the content associated with the navigation event or search page identified at stage 302. The request may comprise a hypertext transfer protocol (HTTP) GET request, a file transfer protocol (FTP) request, or any other network data access request as known in the art. A first set of web content may be provided in response to a HTTP GET request, which may then lead to additional HTTP GET requests in accordance with the first set of web content. For example, a HTTP GET request may result in a base search page being sent to the web browser, which may trigger other page loading operations, such as additional GET requests. The base search page may have multiple embedded images, which are then fetched and rendered using HTTP GET requests for each image. The prerendering process as described may request the full search page, including associated scripts, and then execute those scripts.

At stage 306, the computing device 200 renders content associated with the navigation event determined at stage 302. The content may be rendered in an alternate instance of the web browser that is hidden from the user. For example, the content may be rendered by an alternate process or in a hidden web browser tab.

In some aspects, the rendered content may include a redirection operation. An example of a redirection operation is when the act of loading a first page, for instance, www.a.com, causes the browser to load a second page, such as www.b.com. Redirection may occur in response to a HTML tag, a JAVASCRIPT navigation command, or the like. In the case a prerendered page requests a redirection operation, said redirection operation would also occur in the alternate instance.

In some aspects, a first redirection operation may lead to subsequent redirections. For example, www.a.com may lead to www.b.com, which leads to www.c.com. Aspects of the system and method may account for this fact, such as by storing a history of redirection operations and prerendering the last page in a series in response to a first page being identified to prerender. In some aspects, the method 300 may short-circuit redirection operations by not prerendering intermediate pages when the destination result page (i.e. the page at the end of the redirection operations) is known, and only prerendering the final page in the series.

At stage 308, the computing device 200 may determine whether the user has selected the link identified at stage 302 or performed a search operation within a particular time period. For example, the method 300 may wait for 10 seconds, 20 seconds, 30 seconds, one minute, 5 minutes, or any other time frame. In some aspects, the time frame may be configurable within an options menu associated with the web browser. The time frame may also be specified by the server 104. For example, the server 104 may embed a timeout value within a prerender tag, indicating the length of time the content associated with the tag should be held before being discarded. If the user has selected the link within the time period, the method 300 proceeds to stage 312. Otherwise, the method 300 proceeds to stage 310.

At stage 310, the computing device 200 discards the prerendered content. The prerendered content is allowed to expire in this manner in order to free up system resources associated with the prerender operation and prevent the user from being presented with stale data. In some aspects, a different expiration period may be specified for different types of data. For example, data that is likely to rapidly change, such as breaking news articles, stock quotes, syndication feeds, and the like, is more likely to grow stale quickly, and might be associated with a shorter expiration timer, such as 10 seconds, 20 seconds, or one minute. Data that is less likely to change, such as reference articles, archives, box scores, and the like, might be associated with a longer expiration timer, such as an hour, 6 hours, 24 hours, a week, or the like. In some aspects, the wait time is based on a page type. For example, if the user is viewing a lengthy news article, a longer wait time may be specified when prerendering a next page of the article to provide the user time to read the current page of the article before selecting the next page. In some aspects, the wait time is determined by a time-to-live (TTL) parameter embedded within the page. In some aspects, the wait time is hard coded within the browser. The method 300 then ends after the prerendered content is discarded, though in some aspects the method 300 may repeat indefinitely as the user browses web content.

At stage 312, the computing device 200 merges the alternate instance containing the prerendered content into the visible user instance, in response to the user performing a search operation. In this manner, the computing device 200 displays the content associated with the navigation event instantly, without a delay while the page data is requested from and received from the host server. Search results may be merged into the search page as the results are received from a server. In some aspects, the user may select the navigation event prior to the prerendering operation completing. In such cases, the partially loaded page would be merged into the current user instance. The partially loaded page would then continue to load in the current user instance as normal. The method 300 then ends after making the prerendered content available to the user.

Figure 4:
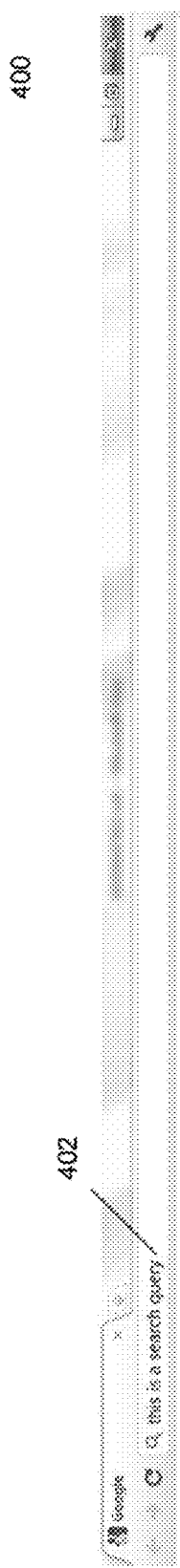
FIG. 4 is a screen capture of an example of a browser window showing the use of a text entry field for entering a search query or an address in accordance with aspects of the disclosure.

FIG. 4 is a screen capture of an example of a browser window 400 showing the use of a text entry field 402 for entering a search query or an address in accordance with aspects of the disclosure. The text entry field 402 shown may function as an "Omnibox", allowing the user to type in a search query or a website URL. If the user enters a website URL, the browser may navigate to the URL. If the user does not enter a URL, the browser may present a list of search results associated with the entered text.

Figure 5:
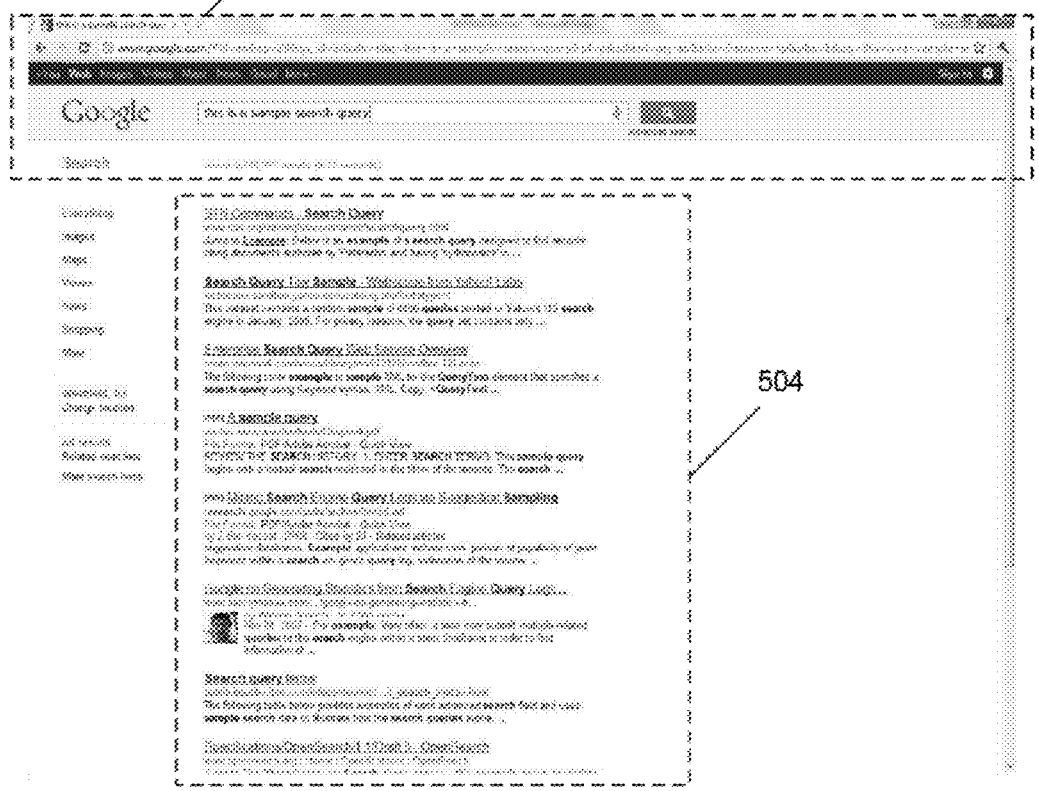
FIG. 5 is a screen capture of an example of a search page in accordance with aspects of the disclosure.

FIG. 5 is a screen capture of an example of a search page 500 in accordance with aspects of the disclosure. The search page 500 is made up of interface controls, images, and formatting data, such as the page header 502, and a set of search results 504. In pages configured to accept search queries via a search API, the search results 504 may be received separately from the rest of the page. This allows formatting data, scripts, logos, headers, style sheets, and the like, such as the page header 502, to be loaded independently from the search results 504. As such, page elements other than the search results may be rendered prior to the entry of a search query, allowing for immediate display of search results as they are received in response to a search query. Aspects of the disclosure may prerender these page elements in a hidden browser instance to facilitate instant display of search results.

Figure 6:
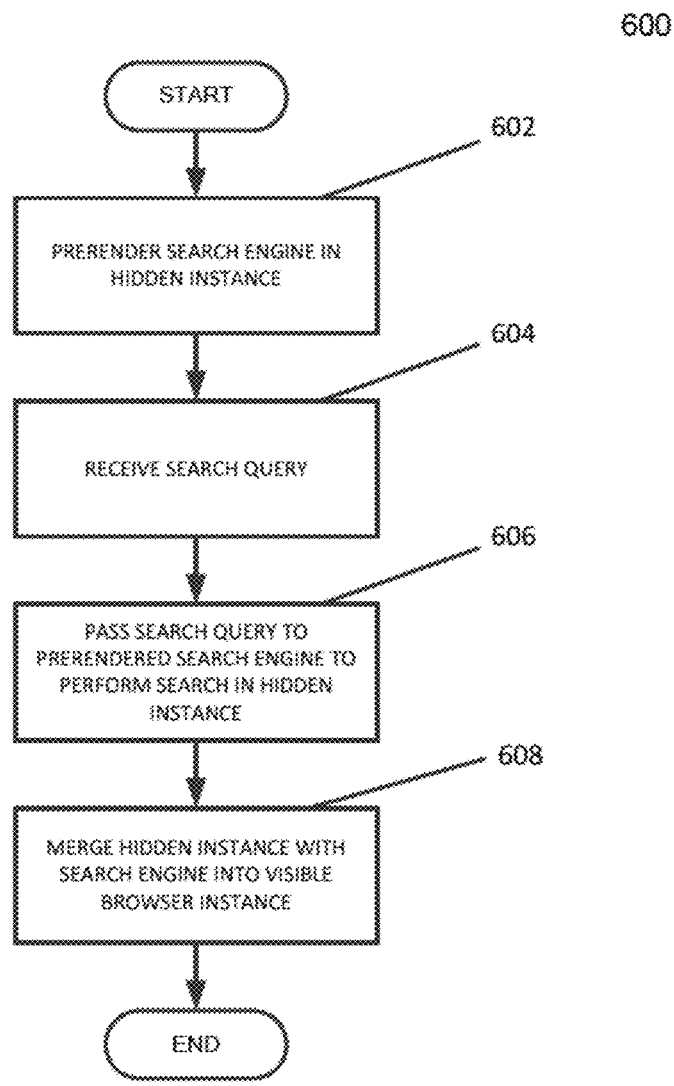
FIG. 6 is a flow diagram depicting an example of a method for prerendering a search page to improve access to search results in accordance with aspects of the invention.

FIG. 6 is a flow diagram depicting an example of a method 600 for preloading a search page to improve access to search results in accordance with aspects of the invention. The method 600 provides for prerendering of a search engine page in a hidden browser instance. When a search query is provided, the query is passed to the prerendered search engine via a search API, and the prerendered search engine is merged into an active browser session. In this manner, search results are provided to the user as soon as the results are received from the search engine, with no delay while the search engine page loads.

At stage 602, the search engine page is prerendered in a hidden browser instance. The search engine page may be prerendered in response to user input, or it may be prerendered when the browser is loaded. For example, the search engine page may be prerendered when a text entry field that accepts search queries receives focus, when the user enters at least one text character in the text entry field, or after at least one "spacebar" character is entered in the text entry field (to distinguish the text entry from a URL). The prerendering process of the search engine may include requesting any or all of page formatting instructions, images, logos, scripts, style sheets, or any other content that must be received in order to render the web page, aside from the search results responsive to the query.

At stage 604, a search query is received. The search query may be received in response to the user entering text in the text field, or the query may be identified after the user performs a selection operation, such as pressing the "enter" key after entering text in the text field. The search query may also be identified via other methods, such as by detecting a "spacebar" character in a text entry field. In some aspects, the search query is only sent to the search engine after the "enter" key has been pressed and the text string is determined to not be a URL, in order to preserve user privacy (e.g., to avoid sending URLs typed by the user for navigation purposes to the server as search engine queries).

At stage 606, the search query is passed to the prerendered search engine page. The search query may be communicated to the prerendered search page using a search API, where the query is sent via a scripting interface. For example, the query may be sent to the search engine via an AJAX interface on the search engine page.

At stage 608, the prerendered search page is merged into the active browser instance to display the search results. Search results may thus be instantly presented to the user as they are received from the search engine server, as the other content of the search engine page has already been rendered.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for faster display of search results. Since the non-search-result content of the search engine page is prerendered, delay associated with requesting, downloading, and rendering such content is eliminated. This allows display of search results as soon as the results are received from the search engine server. Display of search results in such a manner may save multiple seconds of delay during which the user would otherwise be idle while waiting for the page data to render.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer implemented method for improving access to search results, the method comprising:
    prerendering, using a processor, a search engine page in a hidden browser instance, such that at least some portion of content of the search engine page other than search results responsive to a search query is rendered;
    receiving the search query via a text entry field;

passing the search query to the search engine page to perform a search using the search query; and merging the prerendered content of the search engine page with display content loaded in an active browser instance to facilitate display of one or more search results responsive to the search query as the one or more search results are received via the search engine.

2. The method of claim 1, wherein the text entry field allows for navigation within a web browser by entry of a website address.

3. The method of claim 1, wherein the text entry field determines whether the text entry is a search query or a website address.

4. The method of claim 1, wherein the search query is passed to the search engine page using a search application programming interface (API).

5. The method of claim 4, wherein the search engine page is configured to receive a search query via a scripted interface provided by the search API.

6. The method of claim 1, further comprising configuring a web browser to use a particular search engine for the search engine page.

7. The method of claim 1, further comprising prerendering the search engine page in response to at least one of the browser executing, detecting interface focus on the text entry field, detecting text entry in the text entry field, determining that the text entry in the text entry field is not an address, and detecting an enter character in the text entry field.

8. The method of claim 1, wherein the search query is passed to the search engine in response to at least one of detecting interface focus on the text entry field, detecting text entry in the text entry field, determining that the text entry in the text entry field is not an address, and detecting an enter character in the text entry field.

9. The method of claim 1, wherein the merging comprises:
determining whether the prerendered search engine page is partially loaded; and
merging a portion of content associate with the partially loaded prerendered search engine page with the display content loaded in the active browser by blending the contents together thereto.

10. A processing system for improving access to search results, the processing system comprising:
at least one processor; and
a memory coupled to the processor;
wherein the processor is configured to:
execute a browser application;
prerender a search engine page in a hidden instance of the browser application, such that at least some portion of content of the search engine page other than search results responsive to a search query is rendered;
receive the search query via a text entry field;
pass the search query to the search engine page to perform a search using the search query; and
merge the prerendered content of the search engine page with display content loaded in an active browser instance to facilitate display of one or more search results responsive to the search query as the one or more search results are received via the search engine.

11. The processing system of claim 10, wherein the text entry field allows for navigation within a web browser by entry of a website address.

12. The processing system of claim 10, wherein the text entry field determines whether the text entry is a search query or a website address.

13. The processing system of claim 10, wherein the search query is passed to the search engine page using a search application programming interface (API).

14. The processing system of claim 13, wherein the search engine page is configured to receive a search query via a scripted interface provided by the search API.

15. The processing system of claim 10, wherein the processor is further configured to configure a web browser to use a particular search engine for the search engine page.

16. The processing system of claim 10, wherein the processor is further configured to prerender the search engine page in response to at least one of the browser executing, detecting interface focus on the text entry field, detecting text entry in the text entry field, determining that the text entry in the text entry field is not an address, and detecting an enter character in the text entry field.

17. The processing system of claim 10, wherein the search query is passed to the search engine in response to at least one of detecting interface focus on the text entry field, detecting text entry in the text entry field, determining that the text entry in the text entry field is not an address, and detecting an enter character in the text entry field.

18. A non-transitory computer readable storage medium containing instructions that, when executed by a processor cause the processor to perform a method comprising:
prerendering a search engine page in a hidden browser instance, such that at least some portion of content of the search engine page other than search results responsive to a search query is rendered;
receiving the search query via a text entry field;
passing the search query to the search engine page to perform a search using the search query; and
merging the prerendered content of the search engine page with display content loaded in an active browser instance to facilitate display of one or more search results responsive to the search query as the one or more search results are received via the search engine.

19. The non-transitory computer readable storage medium of claim 18, wherein the text entry field allows for navigation within a web browser by entry of a website address.

20. The non-transitory computer readable storage medium of claim 18, wherein the text entry field determines whether the text entry is a search query or a website address.

21. The non-transitory computer readable storage medium of claim 18, wherein the search query is passed to the search engine page using a search application programming interface (API).

* * * * *